United States Patent [19]
Mallick

[11] Patent Number: 5,897,655
[45] Date of Patent: Apr. 27, 1999

[54] SYSTEM AND METHOD FOR CACHE REPLACEMENT WITHIN A CACHE SET BASED ON VALID, MODIFIED OR LEAST RECENTLY USED STATUS IN ORDER OF PREFERENCE

[75] Inventor: Soummya Mallick, Austin, Tex.

[73] Assignee: International Business Machines Corporation, Armonk, N.Y.

[21] Appl. No.: 08/763,275

[22] Filed: Dec. 10, 1996

[51] Int. Cl.$^6$ .................................................. G06F 12/12
[52] U.S. Cl. ........................ 711/134; 711/136; 711/144; 711/126; 711/128; 711/145; 711/141
[58] Field of Search .................... 711/118, 126, 711/128, 133, 134, 136, 141, 142, 143, 144, 145, 146, 147, 155, 156, 159, 160, 165; 371/31; 395/185.07, 875

[56] References Cited

U.S. PATENT DOCUMENTS

| | | | |
|---|---|---|---|
| 4,802,086 | 1/1989 | Gay et al. ............................... | 711/133 |
| 4,967,414 | 10/1990 | Lusch et al. ......................... | 395/183.21 |
| 5,197,139 | 3/1993 | Emma et al. ............................ | 711/207 |
| 5,218,685 | 6/1993 | Jones ....................................... | 711/160 |
| 5,261,067 | 11/1993 | Whelan .................................... | 711/141 |
| 5,584,014 | 12/1996 | Nayfeh et al. ........................... | 711/134 |
| 5,640,339 | 6/1997 | Davis et al. .............................. | 365/63 |
| 5,668,972 | 9/1997 | Liu et al. ................................ | 711/136 |

*Primary Examiner*—Tod R. Swann
*Assistant Examiner*—B. James Peikari
*Attorney, Agent, or Firm*—Casimer K. Salys; Michael A. Davis, Jr.

[57] ABSTRACT

In a method and system for storing information within a set of a cache memory, the set has multiple locations. The information is stored at a selected one of the locations. The selected location satisfies one of the following conditions (a), (b) and (c): (a) the selected location is invalid; (b) each of the locations is valid, and the selected location is unmodified; (c) each of the locations is valid and modified, and the selected location is least recently used among the locations.

10 Claims, 6 Drawing Sheets

SYSTEM AND METHOD FOR CACHE REPLACEMENT WITHIN A CACHE SET BASED ON VALID, MODIFIED OR LEAST RECENTLY USED STATUS IN ORDER OF PREFERENCE

CROSS-REFERENCE TO RELATED APPLICATION

This patent application is related to copending U.S. patent application Ser. No. 08/763,276 filed concurrently herewith.

TECHNICAL FIELD

This patent application relates in general to information processing systems and in particular to a method and system for storing information in a cache memory.

BACKGROUND

A system for processing information can include a system memory. Moreover, one or more devices of the system can include a cache memory. A cache memory is a relatively small high-speed memory that stores a copy of information from one or more portions of the system memory. Normally, the cache memory is physically distinct from the system memory, and each device manages the state of its respective cache memory.

A device can copy information from a portion of the system memory into the device's cache memory. The device can modify information in its cache memory. Further, the device can copy modified information from its cache memory back to a portion of the system memory.

According to one technique, the cache memory is logically arranged into multiple sets. Normally, the cache memory is smaller than the system memory, and a limit is imposed on the maximum amount of information physically stored in a set at any single moment. If a set is storing the maximum amount of information, then at least some information in the set is replaced when different information is copied from the system memory into the set.

In a coherent memory system, all devices operate in response to the most recent version of information for the system memory. Such coherency allows synchronization, cooperative use of shared resources, and task migration among the devices. Accordingly, if replaced information is modified relative to an original version of the information stored within the system memory at the same physical address, the device (that includes the cache memory) updates the system memory by copying the modified information from the cache memory to the same physical address within the system memory.

With previous techniques, a device's cache memory operates inefficiently in certain situations where information is replaced in the cache memory. For example, with previous techniques, there is a high likelihood in certain situations that replaced information (1) will be modified relative to an original version of the information stored within the system memory and therefore will be copied from the cache memory to the system memory and (2) subsequently will be requested by the device and therefore will be copied again from the system memory into the cache memory. By repeatedly copying information back-and-forth between the cache memory and system memory in this manner, traffic is added through the system bus, and overall performance of the system is degraded.

Thus, a need has arisen for a method and system for storing information in a cache memory, in which the cache memory operates more efficiently relative to previous techniques.

SUMMARY

In a method and system for storing information within a set of a cache memory, the set has multiple locations. The information is stored at a selected one of the locations. The selected location satisfies one of the following conditions (a), (b) and (c): (a) the selected location is invalid; (b) each of the locations is valid, and the selected location is unmodified; (c) each of the locations is valid and modified, and the selected location is least recently used among the locations.

It is a technical advantage that the cache memory operates more efficiently relative to previous techniques.

BRIEF DESCRIPTION OF THE DRAWINGS

An illustrative embodiment and its advantages are better understood by referring to the following descriptions and accompanying drawings, in which.

DETAILED DESCRIPTION

An illustrative embodiment and its advantages are better understood by referring to FIGS. 1–6 of the drawings.

Figure 1:
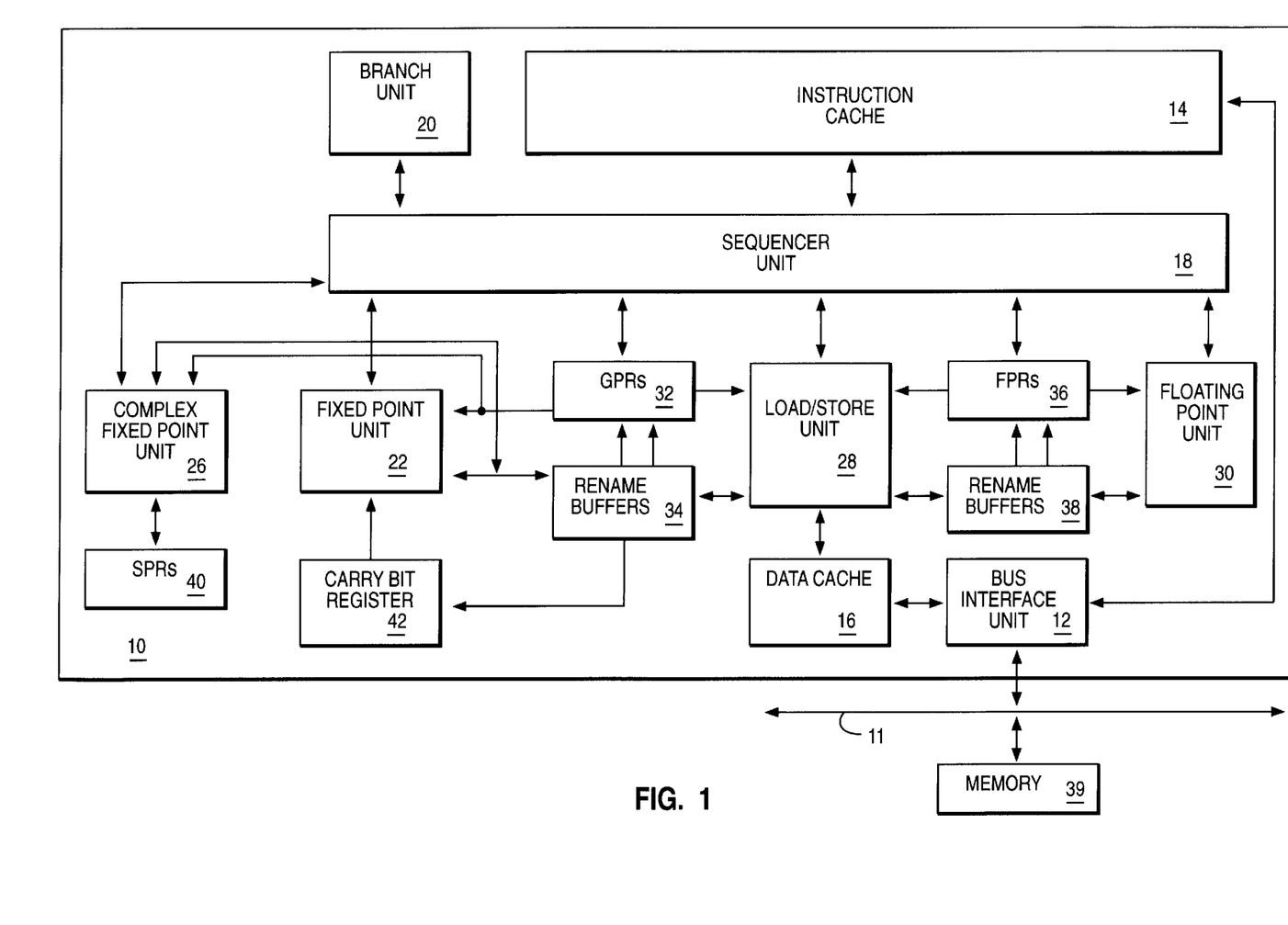
FIG. 1 is a block diagram of a processor system for processing information, according to the illustrative embodiment.

FIG. 1 is a block diagram of a processor 10 system for processing information, according to the illustrative embodiment. In the illustrative embodiment, processor 10 is a single integrated circuit superscalar microprocessor. Accordingly, as discussed further hereinbelow, processor 10 includes various units, registers, buffers, memories, and other sections, all of which are formed by integrated circuitry. Also, in the illustrative embodiment, processor 10 operates according to reduced instruction set computing ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 memory and to a data cache 16 memory of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18, in the illustrative embodiment the execution circuitry of processor 10 includes multiple execution units, namely a branch unit 20, a fixed point unit ("FXU") 22, a complex fixed point unit ("CFXU") 26, a load/store unit ("LSU") 28 and a floating point unit ("FPU") 30. FXU 22, CFXU 26 and LSU 28 input their source operand information from general purpose architectural registers ("GPRs") 32 and fixed point rename buffers 34. Moreover, FXU 22 inputs a "carry bit" from a carry bit ("CA") register 42. FXU 22, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

In response to a "load" instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a "store" instruction, LSU 8 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches the instructions to selected ones of execution units 20, 22, 26, 28 and 30. Each execution unit executes one or more instructions of a particular class of instructions. For example, FXU 22 executes a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

As information is stored at a selected one of rename buffers 34, such information is associated with a storage location (e.g. one of GPRs 32 or CA register 42) as specified by the instruction for which the selected rename buffer is allocated. Information stored at a selected one of rename buffers 34 is copied to its associated one of GPRs 32 (or CA register 42) in response to signals from sequencer unit 18. Sequencer unit 18 directs such copying of information stored at a selected one of rename buffers 34 in response to "completing" the instruction that generated the information. Such copying is called "writeback".

As information is stored at a selected one of rename buffers 38, such information is associated with one of FPRs 36. Information stored at a selected one of rename buffers 38 is copied to its associated one of FPRs 36 in response to signals from sequencer unit 18. Sequencer unit 18 directs such copying of information stored at a selected one of rename buffers 38 in response to "completing" the instruction that generated the information.

Processor 10 achieves high performance by processing multiple instructions simultaneously at various ones of execution units 20, 22, 26, 28 and 30. Accordingly, each instruction is processed as a sequence of stages, each being executable in parallel with stages of other instructions. Such a technique is called "pipelining". In the illustrative embodiment, an instruction is normally processed as six stages, namely fetch, decode, dispatch, execute, completion, and writeback.

In the fetch stage, sequencer unit 18 selectively inputs (from instructions cache 14) one or more instructions from one or more memory addresses storing the sequence of instructions discussed further hereinabove in connection with branch unit 20 and sequencer unit 18.

In the decode stage, sequencer unit 18 decodes up to two fetched instructions.

In the dispatch stage, sequencer unit 18 selectively dispatches up to two decoded instructions to selected (in response to the decoding in the decode stage) ones of execution units 20, 22, 26, 28 and 30 after reserving rename buffer entries for the dispatched instructions' results (destination operand information). In the dispatch stage, operand information is supplied to the selected execution units for dispatched instructions. Processor 10 dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, processor 10 is able to execute instructions out-of-order relative to their programmed sequence.

In the completion stage, sequencer unit 18 indicates an instruction is "complete". Processor 10 "completes" instructions in order of their programmed sequence.

In the writeback stage, sequencer 18 directs the copying of information from rename buffers 34 and 38 to GPRs 32 and FPRs 36, respectively. Sequencer unit 18 directs such copying of information stored at a selected rename buffer. Likewise, in the writeback stage of a particular instruction, processor 10 updates its architectural states in response to the particular instruction. Processor 10 processes the respective "writeback" stages of instructions in order of their programmed sequence. Processor 10 advantageously merges an instruction's completion stage and writeback stage in specified situations.

In the illustrative embodiment, each instruction requires one machine cycle to complete each of the stages of instruction processing. Nevertheless, some instructions (e.g., complex fixed point instructions executed by CFXU 26) may require more than one cycle. Accordingly, a variable delay may occur between a particular instruction's execution and completion stages in response to the variation in time required for completion of preceding instructions.

In the illustrative embodiment, processor 10 is an enhanced version of the PowerPC 603e RISC microprocessor available from IBM Microelectronics Division, Hopewell Junction, N.Y. The PowerPC 603e RISC microprocessor is more completely described in the publication entitled *PowerPC 603e RISC Microprocessor User's Manual,* published by IBM Microelectronics Division, Hopewell Junction, N.Y., Telephone 1-800-PowerPC, which is hereby fully incorporated by reference herein. Processor 10 is enhanced relative to the PowerPC 603e RISC microprocessor, as processor 10 implements the improved method and system of the illustrative embodiment for storing information in a cache memory.

Figure 2:
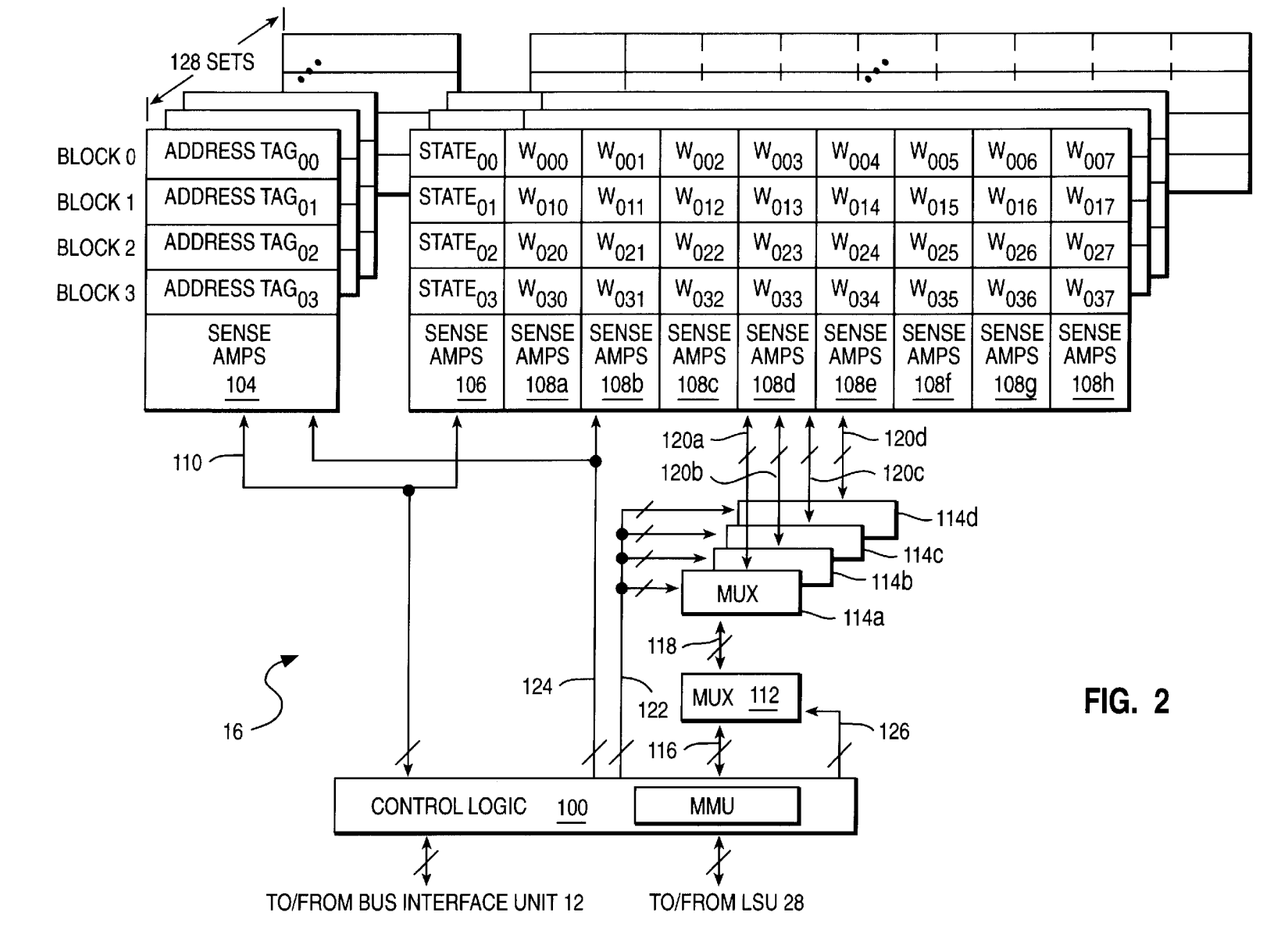
FIG. 2 is a block diagram of a data cache of the processor of FIG. 1.

FIG. 2 is a block diagram of data cache 16. Data cache 16 of FIG. 2 is likewise representative of instruction cache 14. Each of data cache 16 and instruction cache 14 is a 16-kilobyte, four-"way" set-associative cache having 128 sets. In an alternative embodiment, one or each of data cache 16 and instruction cache 14 has only a single set and is therefore a "fully associative" cache. Data cache 16 and instruction cache 14 are addressed in response to physical (i.e. "real") addresses.

Accordingly, FIG. 2 shows control logic 100 which includes a memory management unit ("MMU") for translating effective addresses to associated physical addresses. For example, effective addresses are received from LSU 28 (FIG. 1) of processor 10. In the illustrative embodiment, an effective address's bits $2^0$ through $2^{11}$ are unchanged by translation into its associated physical address, so the effective address's bits $2^0$ through $2^{11}$ have the same digital logic values as the associated physical address's bits $2^0$ through $2^{11}$.

Each of data cache 16 and instruction cache 14 is logically arranged into 128 congruence classes (i.e. sets) as shown in FIG. 2. As an example, for data cache 16, each set has a respective preassigned associated group of four lines (i.e. four "ways", Blocks 0-3) within data cache 16. Each block is able to store a respective address tag, respective state bits (e.g. including (a) "MESI" state bits as discussed further hereinbelow in connection with FIG. 3 and (b) "LRU" status bits as discussed further hereinbelow in connection with FIGS. 4–6), and a respective group of eight words of information. Each word has 4 bytes (i.e. 32 bits).

Thus, Block 3 of Set 0 is able to store an Address $Tag_{03}$, state bits $State_{03}$, and words $W_{030}$ through $W_{037}$. Likewise, each Block y of Set x is able to store an Address $Tag_{xy}$, state bits $State_{xy}$, and words $W_{xy0}$ through $W_{xy7}$, where x is a variable integer set number ranging from 0 through 127, and where y is a variable integer block number ranging from 0 through 3.

A set is specified by a physical address's bits $2^5$ through $2^{11}$. Thus, each set includes multiple addresses, all of which share the same seven physical address bits $2^5$ through $2^{11}$. Accordingly, at any single moment, data cache 16 stores information for up to four physical addresses belonging to a particular Set x, as specified by Address $Tag_{x0}$ through Address $Tag_3$ stored in Set x's associated group of four blocks within data cache 16.

For example, (a) in Block 0 of Set 0, data cache 16 can store Address $Tag_{00}$ including a first address's bits $2^{12}$ through $2^{31}$, (b) in Block 1 of Set 0, data cache 16 can store Address $Tag_{01}$ including a second address's bits $2^{12}$ through $2^{31}$, (c) in Block 2 of Set 0, data cache 16 can store Address $Tag_{02}$ including a third address's bits $2^{12}$ through $2^{31}$, and (d) in Block 3 of Set 0, data cache 16 can store Address $Tag_{03}$ including a fourth address's bits $2^{12}$ through $2^{31}$. Thus, each Address $Tag_{xy}$ has 20 bits.

Since each Address $Tag_{xy}$ has 20 bits, sense amps 104 includes 80 sense amps (20 sense amps multiplied by 4 Blocks 0-3). Similarly, since each word $W_{xyz}$ (where z is an integer word number from 0 through 7) has 32 bits, each of sense amps 108a–h includes a respective group of 128 sense amps (32 sense amps multiplied by 4 Blocks 0-3), so that sense amps 108a–h include a combined total of 1024 sense amps (128 sense amps multiplied by 8 Words 0–7). Likewise, the number of sense amps in sense amps 106 is equal to four times the number of bits per $State_{xy}$.

Each 20-bit Address $Tag_{xy}$ includes a respective group of 20 static random access memory ("SRAM") cells, each SRAM cell being able to store a respective single bit of digital information. Similarly, each 32-bit word $W_{xyz}$ includes a respective group of 32 SRAM cells, each SRAM cell being able to store a respective single bit of digital information. Likewise, the number of SRAM cells in each $State_{xy}$ is equal to the number of bits per $State_{xy}$.

The 80 sense amps of sense amps 104 are organized so that (1) each of the 128 sets of 20 SRAM cells denoted as Address $Tag_{x0}$ (where x is the set number) is coupled to a first group of 20 sense amps (of sense amps 104), respectively, (2) each of the 128 sets of 20 SRAM cells denoted as Address $Tag_{x1}$, is coupled to a second group of 20 sense amps (of sense amps 104), respectively, (3) each of the 128 sets of 20 SRAM cells denoted as Address $Tag_{x2}$ is coupled to a third group of 20 sense amps (of sense amps 104), respectively, and (4) each of the 128 sets of 20 SRAM cells denoted as Address $Tag_{x3}$ is coupled to a fourth group of 20 sense amps (of sense amps 104), respectively.

Accordingly, each sense amp (of sense amps 104) is coupled to a respective family of 128 SRAM cells which store digital information for bit $2^q$ of Address $Tag_{xy}$, where: (a) q is a constant (i.e. common to all SRAM cells of the family) bit number from 0 through 19, (b) x is a variable (i.e. different for all SRAM cells of the family) set number from 0 through 127, and (c) y is a constant block number from 0 through 3.

The 1024 sense amps of sense amps 108a–h are organized so that (1) each of the 128 sets of 256 SRAM cells denoted as $W_{x0z}$, is coupled through a first group of 256 sense amps (of sense amps 108a–h), respectively, to a multiplexer 114a via a bus 120a, (2) each of the 128 sets of 256 SRAM cells denoted as $W_{x1z}$ is coupled through a second group of 256 sense amps (of sense amps 108a–h), respectively, to a multiplexer 114b via a bus 120b, (3) each of the 128 sets of 256 SRAM cells denoted as $W_{x2z}$ is coupled through a third group of 256 sense amps (of sense amps 108a–h), respectively, to a multiplexer 114c via a bus 120c, and (4) each of the 128 sets of 256 SRAM cells denoted as $W_{x3z}$ is coupled through a fourth group of 256 sense amps (of sense amps 108a–h), respectively, to a multiplexer 114d via a bus 120d.

Accordingly, each sense amp (of sense amps 108a–h) is coupled to a respective family of 128 SRAM cells which store digital information for bit $2^q$ of words $W_{xyz}$, where: (a) q is a constant bit number from 0 through 31, (b) x is a variable set number from 0 through 127, (c) y is a constant block number from 0 through 3, and (d) s is a constant word number from 0 through 7.

Likewise, sense amps 106 are organized so that (1) each of the 128 sets of SRAM cells denoted as $State_{x0}$ (where x is the set number) is coupled to a first group of sense amps (of sense amps 106), (2) each of the 128 sets of SRAM cells denoted as $State_{x1}$ is coupled to a second group of sense amps (of sense amps 106), (3) each of the 128 sets of 20 SRAM cells denoted as $State_{x2}$ is coupled to a third group of sense amps (of sense amps 106), and (4) each of the 128 sets of SRAM cells denoted as $State_{x3}$ is coupled to a fourth group of sense amps (of sense amps 106).

Accordingly, each sense amp (of sense amps 106) is coupled to a respective family of 128 SRAM cells which store digital information for bit $2^q$ of $State_{xy}$, where: (a) q is a constant bit number, (b) x is a variable set number from 0 through 127, and (c) y is a constant block number from 0 through 3.

Each sense amp inputs and amplifies a voltage from one of its 128 coupled SRAM cells, where the one SRAM cell is selected in response to logic states of control lines 124 output from control logic 100 according to the set number (i.e. according to an address's bits $2^5$ through $2^{11}$ as discussed hereinabove).

Through a bus 110, address tag information is transferred between control logic 100 and Address Tag$_{xy}$, and state information is transferred between control logic 100 and State$_{xy}$. Through buses 116, 118 and 120a–d, data information (or instruction information in the case of instruction cache 14) is transferred between control logic 100 and W$_{xyz}$.

In an example load operation, control logic 100 receives an effective address from LSU 28 (FIG. 1). Control logic 100 determines a particular Set x in response to the received effective address's bits $2^5$ through $2^{11}$ (as discussed hereinabove), and control logic 100 inputs information from Blocks 0–3 of Set x. More particularly, through bus 110, control logic 100 reads the four address tags, Address Tag$_{x0}$, Address Tag$_{x1}$, Address Tag$_2$, and Address Tag$_3$, and their respectively associated four states, State$_{x0}$, State$_{x1}$, State$_2$ and State$_3$.

Further, control logic 100 outputs the received effective address's bits $2^3$ and $2^4$ to multiplexers 114a–d through control lines 122. In response to the logic states of control lines 122, multiplexer 114a outputs a selected double-word from Block 0 of Set x to bus 118. For example, the selected double-word is from either (a) the SRAM cells denoted as W$_{x00}$ and W$_{x01}$, (b) the SRAM cells denoted as W$_{x02}$ and W$_{x03}$, (c) the SRAM cells denoted as W$_{x04}$ and W$_{x05}$, or (d) the SRAM cells denoted as W$_{x06}$ and W$_{x07}$.

Likewise, in response to the logic states of control lines 122, multiplexer 114b outputs a selected double-word from Block 1 of Set x to bus 118, multiplexer 114c outputs a selected double-word from Block 2 of set x to bus 118, and multiplexer 114d outputs a selected double-word from Block 3 of Set x to bus 118. Through bus 118, multiplexer 112 receives all four double-words from multiplexers 114a–d.

MMU of control logic 100 translates the received effective address into a specific physical address. Control logic 100 compares the specific physical address's bits $2^{12}$ through $2^{31}$ against any valid Address Tag$_{xy}$ from bus 110. Validity of an Address Tag$_{xy}$ is indicated by a digital logic value of a "valid" bit in the MESI state bits of State$_{xy}$ associated with Address Tag$_{xy}$. In response to such a comparison, if the specific physical address's bits $2^{12}$ through $2^{31}$ are a match with any valid Address Tag$_{xy}$. Then control logic 100 outputs suitable control signals to a multiplexer 112 through control lines 126, so that multiplexer 112 outputs (to control logic 100 through bus 116) either (a) the double-word from multiplexer 114a if the match is with Address Tag$_{x0}$, (b) the double-word from multiplexer 114b if the match is with Address Tag$_{x1}$, (c) the double-word from multiplexer 114c if the match is with Address Tag$_{x2}$ or (d) the double-word from multiplexer 114d if the match is with Address Tag$_{x3}$.

Accordingly, control logic 100 inputs a double-word from multiplexer 112. Control logic 100 outputs the double-word from multiplexer 112 to LSU 28 as part of the example load operation.

If any block within data cache 16 stores information (e.g. data) at the effective address, then processor 10 invalidates the block by clearing the block's "valid" bit in the MESI state bits of State$_{xy}$. If the invalidated block within data cache 16 stores information which has been modified by processor 10 relative to an original version of the information stored within memory 39 (FIG. 1) at the same physical address (translated in response to the effective address), then processor 10 updates memory 39 by copying the modified information from data cache 16 to the same physical address within memory 39.

Control logic 100 implements a replacement policy for storing new information within data cache 16, as discussed further hereinbelow in connection with FIGS. 5 and 6. In that regard, instruction cache 14 is substantially identical to data cache 16. Relative to instruction cache 14, data cache 16 additionally supports processor 10 write operations to data cache 16. Processor 10 is able to perform such write operations on a byte-by-byte, half-word, word, or double-word basis. Moreover, processor 10 is able to perform a full read-modify-write operation to data cache 16 in a single cycle of processor 10. Data cache 16 selectively operates in either write-back or write-through mode, and it implements control of cacheability, write policy, and memory coherency on a page-by-page and block-by-block basis.

Figure 3:
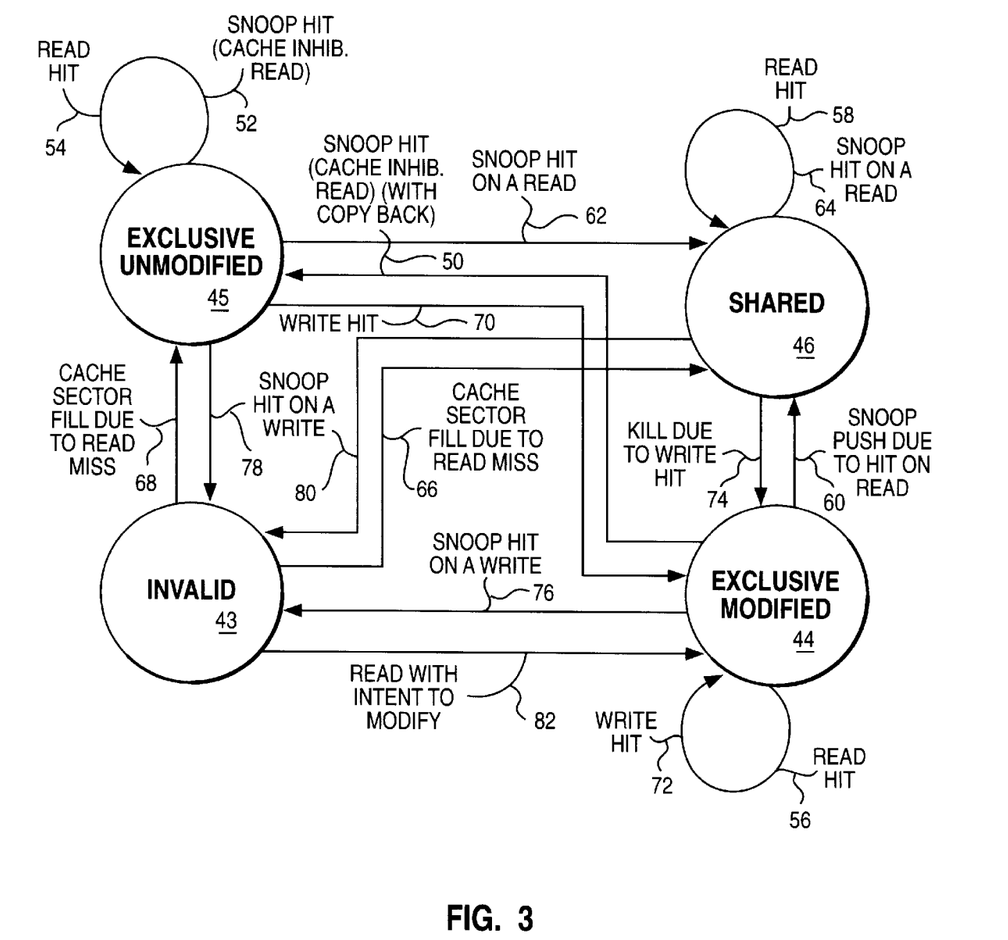
FIG. 3 is a state diagram of a technique for maintaining memory coherency, according to the illustrative embodiment.

FIG. 3 is a state diagram of a technique for maintaining memory coherency, according to the illustrative embodiment. The coherency technique of FIG. 3 is a modified-exclusive-shared-invalid ("MESI") technique. Accordingly, FIG. 3 shows an invalid ("INV") state 43, an exclusive modified ("EM") state 44, an exclusive unmodified ("EU") state 45, and a shared state 46. As discussed hereinabove in connection with data cache 16 of FIG. 2, each State$_{xy}$ stores respective group of MESI bits (including a "valid" bit) which indicate whether its associated block is presently in the invalid state, exclusive modified state, exclusive unmodified state, or shared state.

In the illustrative embodiment, processor 10 maintains memory coherency according to the technique of FIG. 3. Notably, electronic circuitry of processor 10 automatically operates according to the memory coherency technique of FIG. 3, so that software programming of processor 10 is not needed for memory coherency. Accordingly, the maintenance of memory coherency is transparent to software programs executed by processor 10.

LOAD OPERATION

For example, processor 10 is able to execute a load operation for reading information ("requested information") from a physical address within memory 39.

If data cache 16 already stores the requested information in exclusive unmodified state 45 (indicating the information is exclusively cached in data cache 16 but is not modified relative to an original version of the information stored within memory 39 at the same physical address), then processor 10 automatically reads the information from data cache 16, which is faster than reading the information from memory 39 through system bus 11. After processor 10 reads the information from data cache 16, data cache 16 continues storing the information in exclusive unmodified state 45, as indicated by a self-looping "read hit" state transition path 54 at exclusive unmodified state 45.

Similarly, if data cache 16 already stores the requested information in exclusive modified state 44 (indicating the information is exclusively cached in data cache 16 and is modified relative to an original version of the information stored within memory 39 at the same physical address), then processor 10 automatically reads the information from data cache 16. After processor 10 reads the information from data cache 16, data cache 16 continues storing the information in exclusive modified state 44, as indicated by a self-looping "read hit" state transition path 56 at exclusive modified state 44.

Likewise, if data cache 16 already stores the requested information in shared state 46 (indicating the information is also cached in a different cache memory besides data cache 16 and is not modified relative to an original version of the information stored within memory 39 at the same physical address), then processor 10 automatically reads the information from data cache 16. After processor 10 reads the information from data cache 16, data cache 16 continues storing the information in shared state 46, as indicated by a self-looping "read hit" state transition path 58 at shared state 46.

But, if data cache 16 does not already store the requested information, or if data cache 16 stores the requested information in invalid state 43 (indicating the information is not validly cached in data cache 16), then processor 10 automatically outputs (through system bus 11) a copy request for copying the information from memory 39.

LOAD OPERATION—REQUEST FROM ANOTHER DEVICE

In response to another device outputting a copy request through system bus 11, processor 10 determines whether data cache 16 stores the requested information.

If the copy request is output from another device "without intent to cache" the requested information, then processor 10 responds in the following manner. If data cache 16 stores the requested information in exclusive unmodified state 45, then data cache 16 continues storing the information in exclusive unmodified state 45, as indicated by self-looping "snoop hit (cache inhibited read)" state transition path 52. By comparison, if data cache 16 stores the requested information in exclusive modified state 44, then processor 10 (1) outputs a retry request through system bus 11 and (2) updates memory 39 by copying the modified information from cache memory 16 to the same physical address within memory 39. Nevertheless, data cache 16 continues storing the information in exclusive unmodified state 45, as indicated by "snoop hit (cache inhibited read)(with copyback)" state transition path 50.

If the copy request is output from another device, but not "without intent to cache" the requested information, then processor 10 responds in the following manner. If data cache 16 stores the requested information in exclusive modified state 44, then processor 10 (1) outputs a retry request through system bus 11 and (2) updates memory 39 by copying the modified information from cache memory 16 to the same physical address within memory 39. Nevertheless, data cache 16 continues storing the information in shared state 46, as indicated by a "snoop push due to hit on read" state transition path 60 from exclusive modified state 44 to shared state 46.

By comparison, if data cache 16 stores the requested information in exclusive unmodified state 45, then processor 10 does not output a retry request. Instead, processor 10 outputs a shared status through system bus 11. Moreover, data cache 16 continues storing the information in shared state 46, as indicated by a "snoop hit on a read" state transition path 62 from exclusive unmodified state 45 to shared state 46.

Likewise, if data cache 16 stores the requested information in shared state 46, then processor 10 outputs a shared status through system bus 11. Further, data cache 16 continues storing the information in shared state 46, as indicated by a self-looping "snoop hit on a read" state transition path 64 at shared state 46.

LOAD OPERATION—REQUEST FROM PROCESSOR 10

In response to processor 10 outputting a copy request through system bus 11, another device may output a retry request through system bus 11. In response to another device outputting the retry request, processor 10 waits a predetermined amount of time and then again outputs its copy request through system bus 11.

Similarly, in response to processor 10 outputting the copy request through system bus 11, another device may output a shared status through system bus 11. In response to another device outputting the shared status, processor 10 reads the information from memory 39 and stores the information in data cache 16 in shared state 46, as indicated by a "cache sector fill due to read miss" state transition path 66 from invalid state 43 to shared state 46.

By comparison, in response to all other devices (coupled to system bus 11) outputting neither a retry request nor a shared status, processor 10 reads the information from memory 39 and stores the information in data cache 16 in exclusive unmodified state 45, as indicated by a "cache sector fill due to read miss" state transition path 68 from invalid state 43 to exclusive unmodified state 45.

STORE OPERATION

Processor 10 is further able to execute a store operation for modifying information ("requested information") at a physical address within memory 39.

If data cache 16 already stores a copy of the requested information in exclusive unmodified state 45, then processor 10 automatically modifies the information in data cache 16, which is faster than modifying the information in memory 39 through system bus 11. After processor 10 modifies the information in data cache 16, data cache 16 continues storing the information in exclusive modified state 44, as indicated by a "write hit" state transition path 70 from exclusive unmodified state 45 to exclusive modified state 44.

Similarly, if data cache 16 already stores the requested information in exclusive modified state 44, then processor 10 automatically modifies the information in data cache 16. After processor 10 modifies the information in data cache 16, data cache 16 continues storing the information in exclusive modified state 44, as indicated by a self-looping "write hit" state transition path 72 at exclusive modified state 44.

By comparison, if data cache 16 already stores the requested information in shared state 46, then processor 10 automatically outputs a kill request to other devices through system bus 11. After processor 10 outputs the kill request, processor 10 modifies the information in data cache 16, and data cache 16 continues storing the information in exclusive modified state 44, as indicated by a "kill due to write hit" state transition path 74 from shared state 46 to exclusive modified state 44.

But, if data cache 16 does not already store the requested information, or if data cache 16 stores the requested information in invalid state 43, then processor 10 automatically outputs (through system bus 11) a "read and modify" request for reading and modifying the information at the physical address within memory 39.

After processor 10 reads information from memory 39 with intent to modify, processor 10 modifies the information and stores it in data cache 16 in exclusive modified state 44, as indicated by a "read with intent to modify" state transition path 82 from invalid state 43 to exclusive modified state 44.

STORE OPERATION—REQUEST FROM ANOTHER DEVICE

In response to another device outputting either a "read and modify" request or a kill request through system bus 11, processor 10 determines whether data cache 16 stores the requested information.

If data cache 16 stores the requested information in exclusive modified state 44, then processor 10 (1) outputs a retry request through system bus 11 and (2) updates memory 39 by copying the modified information from cache memory 16 to the same physical address within memory 39. Moreover, processor 10 invalidates the information in data cache 16, as indicated by a "snoop hit on a write" state transition path 76 from exclusive modified state 44 to invalid state 43.

By comparison, if data cache 16 stores the requested information in exclusive unmodified state 45, then processor 10 does not output a retry request. Instead, processor 10 invalidates the information in data cache 16, as indicated by a "snoop hit on a write" state transition path 78 from exclusive unmodified state 45 to invalid state 43.

Similarly, if data cache 16 stores the requested information in shared state 46, then processor 10 invalidates the information in data cache 16, as indicated by a "snoop hit on a write" state transition path 80 from shared state 46 to invalid state 43.

Figure 4:
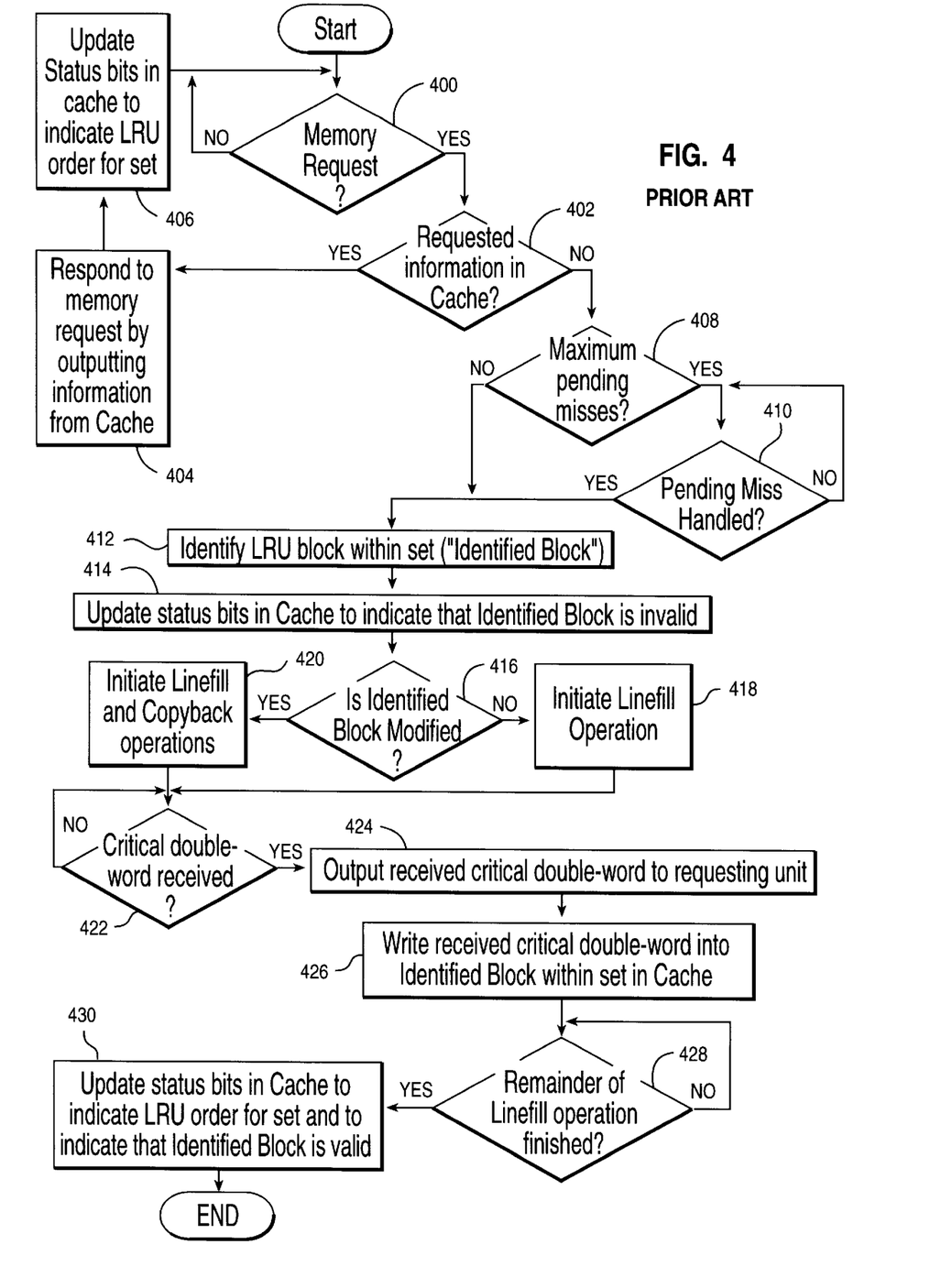
FIG. 4 is a flow chart of a technique for storing information in a cache memory, according to the prior art.

FIG. 4 is a flow chart of a technique for storing information in a cache memory, according to the prior art. The technique begins at a decision block 400, where a data cache waits until a load/store unit outputs a memory request to the data cache. For example, the load/store unit outputs a memory request to the data cache in response to the load/store unit executing a load instruction or a store instruction.

In response to the load/store unit outputting a memory request to the data cache, the technique continues to a decision block 402, where the data cache determines whether it stores the requested information (i.e. information as specified by the memory request). For example, the requested information is information stored at a physical address within a system memory. The physical address is either a load instruction's source address or a store instruction's target address.

If the data cache stores the requested information, the technique continues from decision block 402 to a step 404, where the data cache responds to the memory request by outputting the requested information to the load/store unit. After step 404, the technique continues to a step 406, where the data cache updates state bits in the four blocks of Set x (where x is the set number which is specified by the memory request's translated physical address), in order to indicate a least recently used ("LRU") order for the four blocks. For example, the state bits in the block which stores the requested information are updated in order to indicate that the block is most recently used ("MRU") among the four blocks of Set x. After step 406, the technique returns to decision block 400.

If the data cache does not store the requested information, the technique continues from decision block 402 to a decision block 408, where the data cache determines whether a maximum number of "misses" are pending. For example, if the maximum number of pending "misses" is one, the technique is able to continue to a step 412 only once (i.e. the maximum number of pending "misses") more than a number of times the technique continues to a step 430.

If the maximum number of "misses" is not pending, the technique continues from decision block 408 to step 412. By comparison, if the maximum number of "misses" is pending, the technique continues from decision block 408 to a decision block 410, where the data cache waits until the maximum number of "misses" is no longer pending (i.e. until the data cache handles at least one pending "miss" by continuing to step 430 for such "miss"). In response to the data cache handling at least one pending "miss", the technique continues from decision block 410 to step 412.

At step 412, the data cache identifies (i.e. selects) a block ("Identified Block") among the four blocks of Set x. The Identified Block is (1) an invalid block or (2) if no block is invalid, the block that is least recently used ("LRU") among the four blocks of Set x. After step 412, the technique continues to a step 414, where the data cache invalidates the Identified Block by clearing the Identified Block's "valid" bit in the Identified Block's MESI state bits. After step 414, the technique continues to a decision block 416, where the data cache determines whether the Identified Block stores information which has been modified (as indicated by the Identified Block's MESI state bits) relative to an original version of the information stored within the system memory at the same physical address.

If the Identified Block stores information which has not been modified relative to an original version of the information stored within the system memory at the same physical address, the technique continues from decision block 416 to a step 418. At step 418, the data cache initiates a linefill operation by outputting (through the system bus) a copy request for copying the requested information from the system memory, as discussed further hereinabove in connection with FIG. 3.

In the process of copying the requested information from the system memory, the data cache copies four double-words, one double-word at a time, until the data cache eventually copies an entire line (i.e. four double-words= eight words) of information from the system memory into the Identified Block. Accordingly, the linefill operation is a "burst" linefill operation. The copied line includes the requested information and is specified by bits $2^5$ through $2^{31}$ of the physical address. Of the four copied double-words, the data cache first copies the double-word ("Critical Double-Word") that includes the requested information.

If the Identified Block stores information which has been modified relative to an original version of the information stored within the system memory at the same physical address, the technique continues from decision block 416 to a step 420. At step 420, the data cache initiates (1) a linefill operation (as in step 418 discussed hereinabove) and (2) then a copyback operation. During the copyback operation, the data cache updates the system memory by copying the modified information to the same physical address within the system memory.

After either of steps 418 and 420, the technique continues to a decision block 422, where the data cache waits until it receives the Critical Double-Word from the system memory through the system bus. After the data cache receives the Critical Double-Word from the system memory, the technique continues from decision block 422 to a step 424. At step 424, the data cache outputs the received Critical Double-Word to the requesting unit (i.e. the load/store unit in this example). After step 424, the technique continues to a step 426, where the data cache writes the received Critical Double-Word into the Identified Block (within Set x in the data cache).

After step 426, the technique continues to a decision block 428, where the data cache waits until the remainder of the linefill operation is finished. In the process of finishing the remainder of the linefill operation, the data cache copies the remaining three double-words, one double-word at a time, until the data cache finishes copying the entire line (i.e. four double-words=eight words) of information from the system memory into the Identified Block, as discussed hereinabove. After the remainder of the linefill operation is finished, the technique continues from decision block 428 to step 430.

At step 430, the data cache updates state bits in the four blocks of Set x (where x is the set number which is specified by the memory request's translated physical address), in order to indicate a least recently used ("LRU") order for the four blocks. For example, the state bits in the Identified Block are updated in order to indicate that the Identified Block is most recently used ("MRU") among the four blocks of Set x. Moreover, at step 430, the data cache validates the Identified Block by setting the Identified Block's "valid" bit in the Identified Block's MESI state bits.

Figure 5:
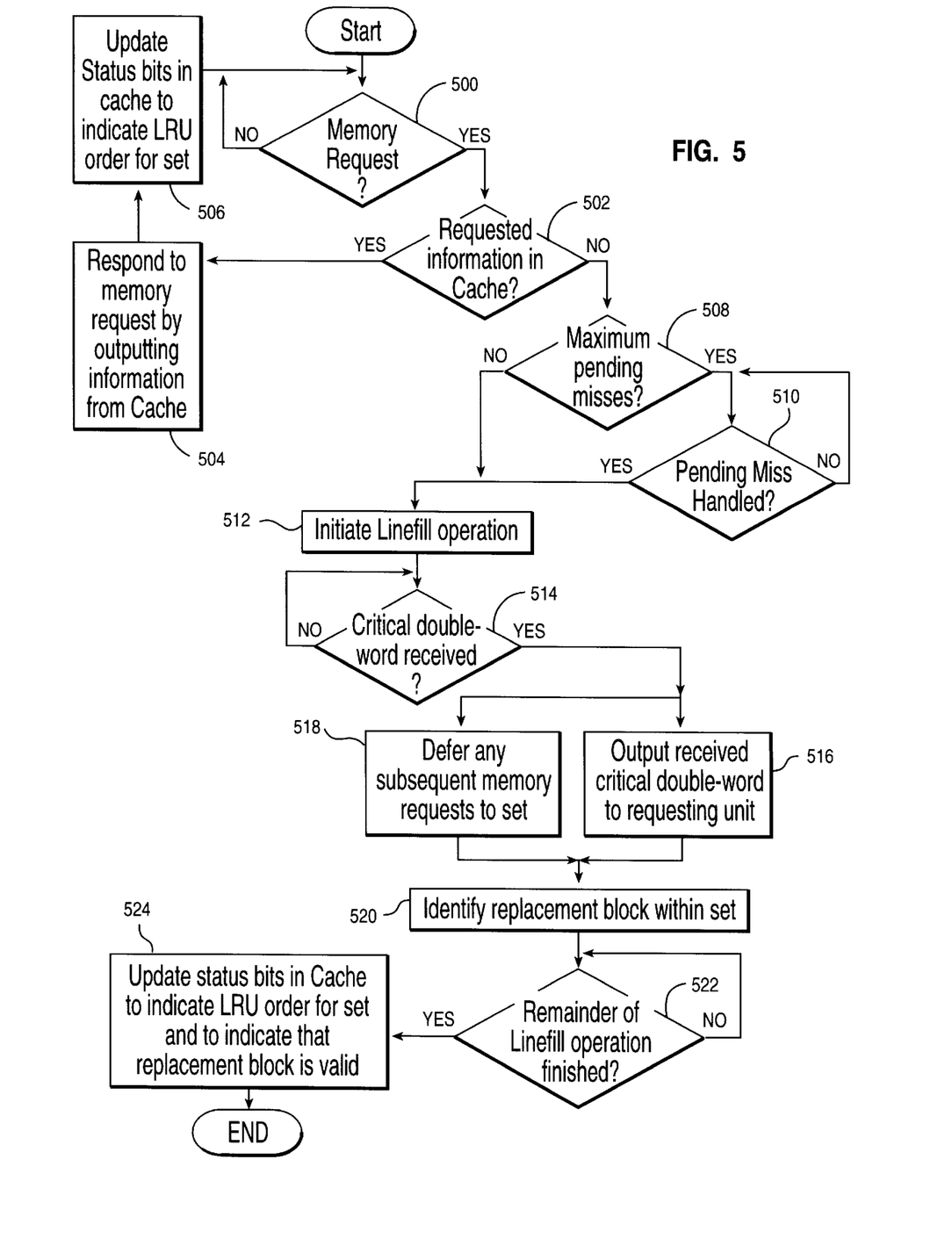
FIG. 5 is a flow chart of a technique for storing information in a cache memory, according to the illustrative embodiment.

FIG. 5 is a flow chart of a technique for storing information in data cache 16, according to the illustrative embodiment. The technique of FIG. 5 is equally applicable to instruction cache 14. The technique begins at a decision block 500, where control logic 100 (FIG. 2) of data cache 16 waits until LSU 28 (FIG. 1) outputs a memory request to data cache 16. For example, LSU 28 outputs a memory request to data cache 16 in response to LSU 28 executing a load instruction or a store instruction.

In response to LSU 28 outputting a memory request to data cache 16, the technique continues to a decision block 502, where control logic 100 determines whether data cache 16 stores the requested information (i.e. information as specified by the memory request). For example, the requested information is information stored at a physical address within system memory 39. The physical address is either a load instruction's source address or a store instruction's target address.

If data cache 16 stores the requested information, the technique continues from decision block 502 to a step 504, where control logic 100 responds to the memory request by transferring the requested information to LSU 28. After step 504, the technique continues to a step 506, where control logic 100 updates state bits in State$_{x0}$, State$_{x1}$, State$_{x2}$ and/or State$_{x3}$ (FIG. 2), where x is the set number which is specified by the memory request's translated physical address. At step 506, control logic 100 updates State$_{x0}$, State$_{x1}$, State$_{x2}$ and/or State$_{x3}$ in order to indicate an LRU order for their respective associated blocks within Set x in data cache 16. For example, control logic 100 updates the state bits in the block which stores the requested information in order to indicate that the block is MRU among the four blocks of Set x. After step 506, the technique returns to decision block 500.

If data cache 16 does not store the requested information, the technique continues from decision block 502 to a decision block 508, where control logic 100 determines whether a maximum number of "misses" are pending. For example, if the maximum number of pending "misses" is one, the technique is able to continue to a step 512 only once (i.e. the maximum number of pending "misses") more than a number of times the technique continues to a step 524.

Notably, in the illustrative embodiment, data cache 16 is a "non-blocking" cache. Accordingly, there is no limit on the number of times that the technique is able to continue to steps 504 and 506 (relative to a number of times the technique continues to step 524), even if the maximum number of "misses" is pending. This is referred to as "hits under misses", which are supported by data cache 16.

If the maximum number of "misses" is not pending, the technique continues from decision block 508 to step 512. By comparison, if the maximum number of "misses" is pending, the technique continues from decision block 508 to a decision block 510, where control logic 100 waits until the maximum number of "misses" is no longer pending (i.e. until control logic 100 handles at least one pending "miss" by continuing to step 524 for such "miss"). In response to control logic 100 handling at least one pending "miss", the technique continues from decision block 510 to step 512.

At step 512, control logic 100 initiates a linefill operation by outputting (through system bus 11 via BIU 12) a copy request for copying the requested information from system memory 39, as discussed further hereinabove in connection with FIG. 3. In the process of copying (through system bus 11 via BIU 12) the requested information from system memory 39, control logic 100 copies four double-words, one double-word at a time, until control logic 100 eventually copies an entire line (i.e. four double-words=eight words) of information from system memory 39 into an identified Replacement Block within data cache 16, as discussed further hereinbelow in connection with step 520 and FIG. 6. Accordingly, the linefill operation is a "burst" linefill operation. The copied line includes the requested information and is specified by bits $2^5$ through $2^{31}$ of the physical address (as translated by control logic 100 in response to the effective address from LSU 28). Of the four copied double-words, control logic 100 first copies the double-word ("Critical Double-Word") that includes the requested information.

Accordingly, after step 512, the technique continues to a decision block 514, where control logic 100 waits until it receives the Critical Double-Word from system memory 39 through system bus 11 via BIU 12. After control logic 100 receives the Critical Double-Word from system memory 39, the technique continues from decision block 514 to steps 516 and 518 in parallel as shown in FIG. 5. At step 516, control logic 100 outputs the received Critical Double-Word to the requesting unit (i.e. LSU 28 in this example).

The existing memory request currently being processed at step 518 is referred to as the "Present Memory Request". At step 518, control logic 100 delays further processing along the steps and decision blocks of FIG. 5 in connection with any other (existing and/or subsequent) memory request from LSU 28, if the other memory request is directed to the same Set x of data cache 16 as the Present Memory Request. Such processing of the other memory request is delayed until control logic 100 finishes processing along the steps and decision blocks of FIG. 5 in connection with the Present Memory Request, through and including step 524. By comparison, if the other memory request is directed to a Set k (where k is an integer number, and k≠x) of data cache 16, then control logic 100 continues processing along the steps and decision blocks of FIG. 5 in connection with the other memory request, in parallel with processing along the steps and decision blocks of FIG. 5 in connection with the Present Memory Request, and irrespective of whether control logic 100 has finished processing along the steps and decision blocks of FIG. 5 in connection with the Present Memory Request.

After steps 516 and 518, the technique continues to a step 520, where control logic 100 identifies (i.e. selects) the Replacement Block within data cache 16, as discussed further hereinbelow in connection with FIG. 6. Moreover, at step 520, control logic 100 writes the received Critical Double-Word into the identified Replacement Block (within Set x in data cache 16), as discussed further hereinbelow in connection with FIG. 6.

After step 520, the technique continues to a decision block 522, where control logic 100 waits until it finishes the remainder of the linefill operation. In the process of finishing the remainder of the linefill operation, control logic 100 copies the remaining three double-words into the identified Replacement Block (within Set x in data cache 16), one double-word at a time, until control logic 100 finishes copying the entire line (i.e. four double-words=eight words) of information from system memory 39 into the Replacement Block, as discussed hereinabove. After control logic 100 finishes the remainder of the linefill operation, the technique continues from decision block 522 to step 524.

At step 524, control logic 100 updates state bits in $State_{x0}$, $State_{x1}$, $State_{x2}$ and/or $State_{x3}$, where x is the set number which is specified by the memory request's translated physical address. At step 524, control logic 100 updates $State_{x0}$, $State_{x1}$, $State_2$ and/or $State_{x3}$ in order to indicate an LRU order for their respective associated blocks within Set x in data cache 16. For example, control logic 100 updates the state bits in $State_{xj}$ (where j is an integer number of the identified Replacement Block) in order to indicate that the identified Replacement Block is MRU among the four blocks of Set x. Moreover, at step 524, control logic 100 validates the identified Replacement Block (i.e. indicates the Replacement Block is valid) by ensuring the Replacement Block's "valid" bit is set to a logic 1 state in the MESI state bits of $State_{xj}$.

Figure 6:
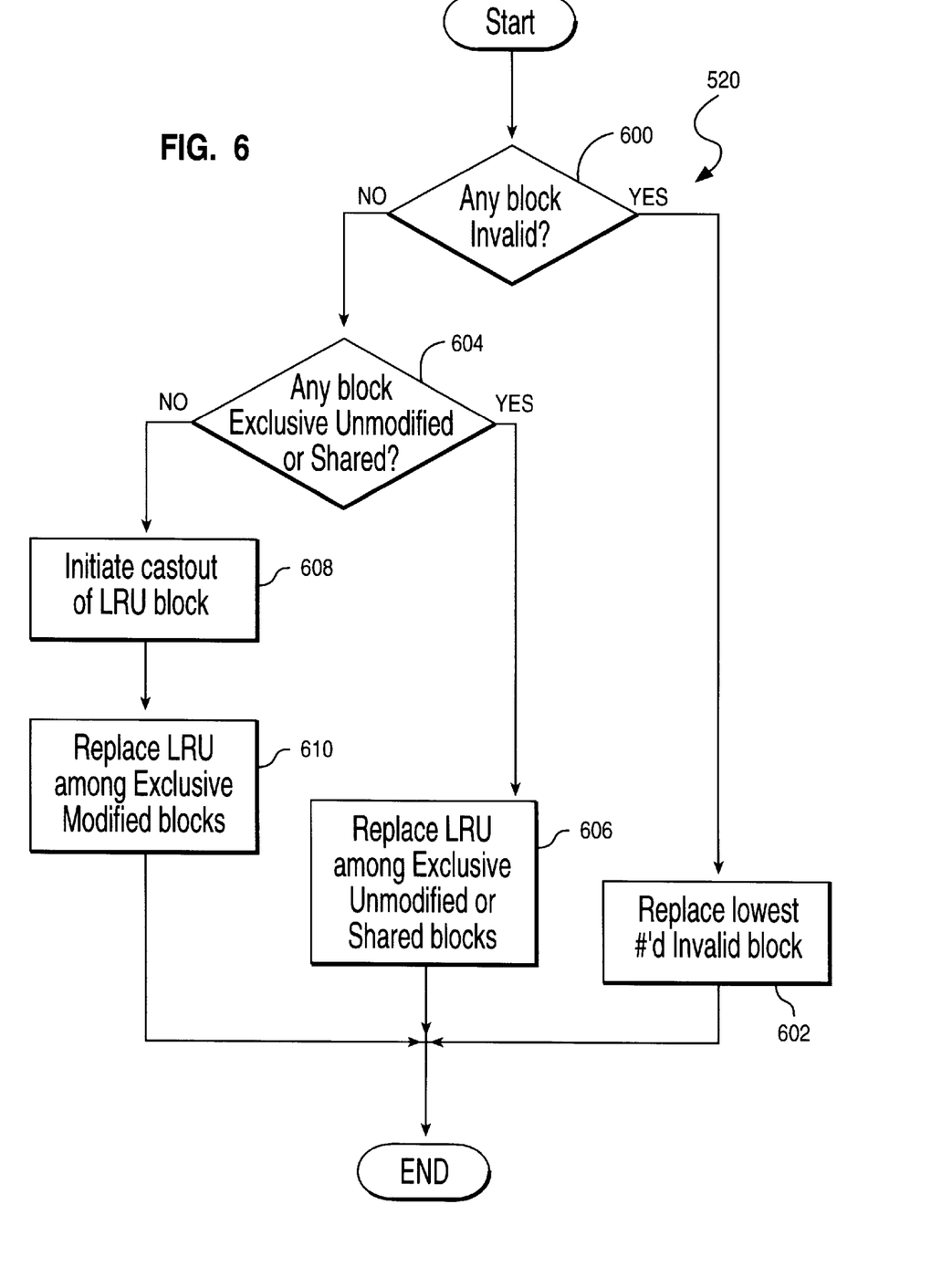
FIG. 6 is a flow chart of a replacement block identification step of the flow chart of FIG. 5.

FIG. 6 is a flow chart of the Replacement Block identification step 520 of FIG. 5. Accordingly, after steps 516 and 518 of FIG. 5, the technique continues to a decision block 600 of FIG. 6.

At decision block 600, control logic 100 reads the MESI state bits of $State_{x0}$, $State_{x1}$, $State_{x2}$ and $State_{x3}$. In response to those MESI state bits for each of Blocks 0, 1, 2 and 3 (in Set x), control logic 100 determines whether the block is invalid, which would be indicated if the block's valid bit (in the block's MESI state bits) has a logic 0 state. If any of Blocks 0, 1, 2 or 3 (in Set x) is invalid, the technique continues from decision block 600 to a step 602.

At step 602, control logic 100 identifies the lowest-numbered one of the invalid blocks to be the Replacement Block in Set x. For example, if Blocks 0 and 3 are invalid, then control logic 100 identifies Block 0 to be the Replacement Block, because 0 is a lower number than 3. Moreover, at step 602, control logic 100 writes the received Critical Double-Word into the identified Replacement Block (within Set x in data cache 16). After step 602, the technique continues to decision block 522 of FIG. 5.

If none of Blocks 0, 1, 2 or 3 (in Set x) is invalid, the technique continues from decision block 600 to a decision block 604. At decision block 604, in response to the MESI state bits for each of Blocks 0, 1, 2 and 3 (in Set x), control logic 100 determines whether the block is in an exclusive unmodified state or a shared state. If any of Blocks 0, 1, 2 or 3 (in Set x) is in an exclusive unmodified state, or if any of Blocks 0, 1, 2 or 3 (in Set x) is in a shared state, the technique continues from decision block 604 to a step 606.

At step 606, control logic 100 identifies (i.e. selects) the Replacement Block as being the least recently used among the group of blocks (in Set x) that are in either the exclusive unmodified state or shared state. This is true even if an exclusive modified block in Set x is less recently used than the identified Replacement Block. In this manner, the technique of FIG. 6 achieves a significant advantage because it avoids a copyback (i.e. castout) operation, as the identified Replacement Block (in either the exclusive unmodified state or shared state) stores information which has not been modified relative to an original version of the information stored within system memory 39 at the same physical address. By avoiding a copyback operation, traffic is reduced through system bus 11, and overall performance of the system is enhanced.

In that regard, control logic 100 identifies (as the Replacement Block) the least recently used block (among the group of blocks (in Set x) that are in either the exclusive unmodified state or shared state) in response to the LRU order information stored within $State_{x0}$, $State_{x1}$, $State_{x2}$ and/or $State_{x3}$. In an alternative embodiment, control logic 100 identifies the Replacement Block according to a technique other than "least recently used" techniques. For example, in one alternative embodiment, control logic 100 identifies the Replacement Block as being a randomly selected one among the group of blocks (in Set x) that are in either the exclusive unmodified state or shared state. Moreover, at step 606, control logic 100 writes the received Critical Double-Word into the identified Replacement Block (within Set x in data cache 16). After step 606, the technique continues to decision block 522 of FIG. 5.

If none of Blocks 0, 1, 2 or 3 (in Set x) is in an exclusive unmodified state, and if none of Blocks 0, 1, 2 or 3 (in Set x) is in a shared state, the technique continues from decision block 604 to a step 608. At step 608, control logic 100 identifies the Replacement Block as being the least recently used among the group of blocks (in Set x) that are in the exclusive modified state. In that regard, control logic 100 identifies the least recently used block (among the group of blocks (in Set x) that are in the exclusive modified state) in response to the LRU order information stored within $State_{x0}$, $State_{x1}$, $State_2$ and/or $State_3$.

Moreover, at step 608, since the identified Replacement Block stores information which has been modified relative to an original version of the information stored within system memory 39 at the same physical address, control logic 100 initiates a copyback (i.e. castout) operation. During the copyback operation, control logic 100 updates system memory 39 by copying the modified information from the identified Replacement Block to the same physical address within system memory 39. After step 608, the technique continues to a step 610, where control logic 100 writes the received Critical Double-Word into the identified Replacement Block (within Set x in data cache 16). After step 610, the technique continues to decision block 522 of FIG. 5.

According to the technique of FIG. 4, the Identified Block is selected at step 412 before the data cache receives the Critical Double-Word from the system memory through the system bus. By comparison, in a significant aspect of the illustrative embodiment, according to the technique of FIG. 5, the Replacement Block is selected at step 520 after control logic 100 receives the Critical Double-Word from system memory 39 through system bus 11 via BIU 12.

Moreover, according to the technique of FIG. 4, the data cache invalidates the Identified Block at step 414 before the data cache receives the Critical Double-Word from the system memory through the system bus. This ensures that, in response to any subsequent memory request from the load/store unit, the data cache does not read information from the Identified Block until after step 430 (i.e. until after the linefill operation is finished). This is because information in the Identified Block is being replaced by different information during the linefill operation. Thus, until after the linefill operation is finished, information in the Identified Block is subject to being inaccurate relative to information stored within the system memory at the same physical address.

Accordingly, the technique of FIG. 4 has several shortcomings. For example, if the data cache supports "hits under misses", then the LRU block (among the four blocks of Set x) may have changed between the moment when the data cache selects the Identified Block at step 412 and the moment when the data cache receives the Critical Double-Word. Thus, by selecting the Identified Block at step 412 before the data cache receives the Critical Double-Word, the data cache fails to account for the possibility that the LRU block (among the four blocks of Set x) may have changed before the data cache receives the Critical Double-Word.

As another example, by invalidating the Identified Block at step 414 before the data cache receives the Critical Double-Word, valid information (in Set x) is stored in a maximum of only three blocks until after the linefill operation is finished. In this manner, if the data cache is normally a four-"way" set-associative cache, the set associativity of Set x is effectively reduced from four-"way" to three-"way" until after the linefill operation is finished. More particularly, between the moment when the data cache invalidates the Identified Block at step 414 and the moment when the linefill operation is finished, the data cache stores valid information for up to only three physical addresses belonging to Set x.

By comparison, in a significant aspect of the illustrative embodiment and the technique of FIG. 5, control logic 100 advantageously invalidates the Replacement Block at either step 602, 606 or 610 after control logic 100 receives the Critical Double-Word. After step 602, 606 or 610, data cache 16 stores valid information for up to only three physical addresses belonging to Set x, until after the linefill operation is finished. Thus, the technique of FIG. 5 achieves an advantage over the technique of FIG. 4, because the technique of FIG. 5 invalidates the Replacement Block for a shorter period of time. More particularly, unlike the technique of FIG. 4, according to the technique of FIG. 5, valid information in the Replacement Block remains valid between the moment when control logic 100 initiates the linefill operation at step 512 and the moment when control logic 100 receives the Critical Double-Word.

While the information remains valid, it is available for control logic 100 to read in connection with subsequent "hits under misses". Moreover, while the information remains valid, the likelihood of a subsequent miss (and hence linefill) is reduced by the technique of FIG. 5, as the set associativity of Set x remains at four-"way" instead of three-"way". In this manner, traffic is reduced through system bus 11, and overall performance of the system is enhanced.

Further, according to the technique of FIG. 5, it is not necessary to invalidate the Replacement Block at any of steps 602, 606 and 610 (FIG. 6). This is because, at step 518, control logic 100 delays further processing along the steps and decision blocks of FIG. 5 in connection with any other (existing and/or subsequent) memory request from LSU 28, if the other memory request is directed to the same Set x of data cache 16 as the Present Memory Request. By comparison, according to the technique of FIG. 4, the data cache invalidates the Identified Block at step 414 by clearing the Identified Block's "valid" bit in the Identified Block's MESI state bits. Consequently, the technique of FIG. 4 includes an additional access to the Identified Block's MESI state bits, which consumes extra power and is therefore a disadvantage.

Although an illustrative embodiment and its advantages have been described in detail hereinabove, they have been described as example and not as limitation. Various changes, substitutions and alterations can be made in the illustrative embodiment without departing from the breadth, scope and spirit of the present inventions.

What is claimed is:

1. A method of storing information within a set of a cache memory, the set having a plurality of locations, at a location selected to satisfy one of the following conditions in decreasing order of preference, comprising:

(a) said selected location is invalid;
   (b) each of the plurality of locations is valid, and said selected location is unmodified; or
   (c) each of the plurality of locations is valid and modified, and said selected location is least recently used among the plurality of locations.

2. The method of claim 1 wherein the cache memory is a data cache memory.

3. The method of claim 2 wherein said data cache memory is a set associative cache memory.

4. The method of claim 2 wherein said data cache memory is a fully associative cache memory.

5. The method of claim 1 and comprising receiving the information from a system memory.

6. A system for storing information within a set of a cache memory, the set having a plurality of locations, comprising:

circuitry for storing the information at a selected location; and
   circuitry for selecting the location to satisfy one of the following conditions in decreasing order of preference;
   (a) said selected location is invalid;
   (b) each of the plurality of locations is valid, and said selected location is unmodified; or
   (c) each of the plurality of locations is valid and modified, and said selected location is least recently used among the plurality of locations.

7. The system of claim 6 wherein the cache memory is a data cache memory.

8. The system of claim 7 wherein said data cache memory is a set associative cache memory.

9. The system of claim 9 wherein said data cache memory is a fully associative cache memory.

10. The system of claim 7 wherein said circuitry is for receiving the information from a system memory.

* * * * *